N. G. EK.
GRAIN SIEVE.
APPLICATION FILED SEPT. 29, 1917.
1,341,792.
Patented June 1, 1920.
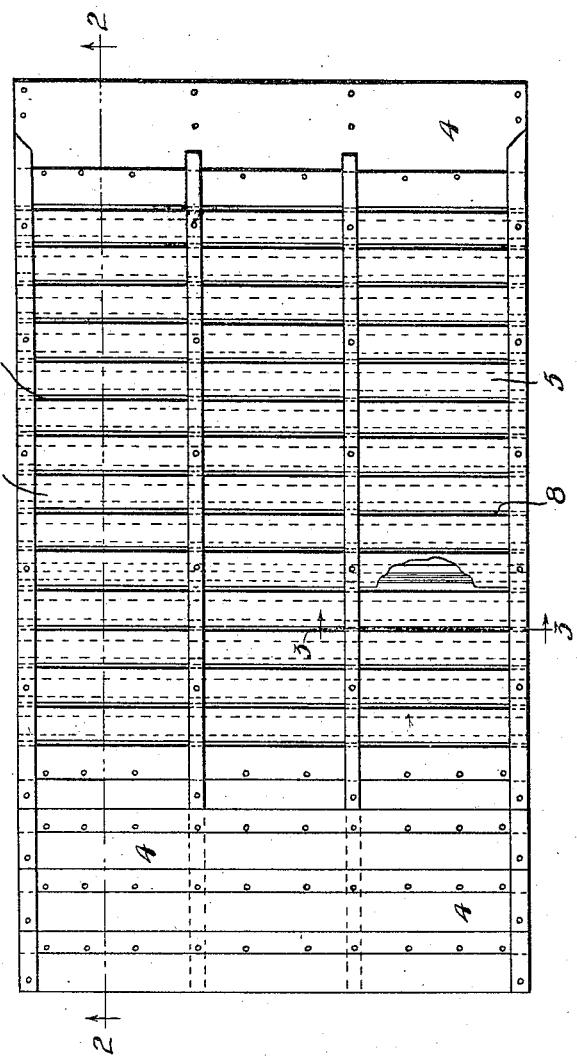
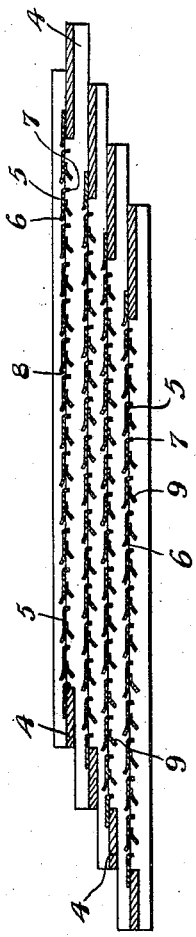
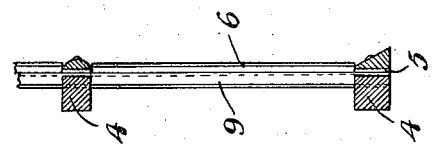
WITNESSES.
H. L. Opsahl.
E. E. Wells
INVENTOR.
NELS GUSTAF EK.
BY HIS ATTORNEYS.

UNITED STATES PATENT OFFICE.

NELS G. EK, OF MINNEAPOLIS, MINNESOTA, ASSIGNOR TO FOSSTON-CARPENTER COMPANY, OF ST. PAUL, MINNESOTA, A CORPORATION OF MINNESOTA.

GRAIN-SIEVE.

1,341,792.

Specification of Letters Patent.

Patented June 1, 1920.

Application filed September 29, 1917. Serial No. 193,938.

*To all whom it may concern:*

Be it known that I, NELS G. EK, a citizen of the United States, residing at Minneapolis, in the county of Hennepin and State of Minnesota, have invented certain new and useful Improvements in Grain-Sieves; and I do hereby declare the following to be a full, clear, and exact description of the invention, such as will enable others skilled in the art to which it appertains to make and use the same.

My present invention relates to fanning mills or grain separators and has for its object to provide a special form of sieve therefor, by means of which wild peas may be separated, particularly from wheat, but also from other grains, such as oats, barley, or rye, for example.

It is a well known fact that wild peas are spherical or round like a ball, and hence, have a very much greater tendency to roll than do wheat kernels, for example. This fact is taken advantage of in my improved sieve, which is illustrated in the accompany drawings, wherein like characters indicate like parts throughout the several views.

Referring to the drawings,

Figure 1 is a plan view of the improved sieve;

Fig. 2 is a vertical section taken on the line 2—2 of Fig. 1; and

Fig. 3 is a fragmentary section on the line 3—3 of Fig. 1.

The improved sieve is especially adapted for use in a gang and is so illustrated in the accompanying drawings. The gang comprises a frame 4 and a multiplicity of sieve surfaces, each of which latter is made up of a multiplicity of transverse bars 5, preferably of thin sheet metal having slightly upturned lips 6 at their lower or deliver edges and having slightly downturned lips 7 at their upper or receiving edges. These bars are spaced to form gaps at 8, the said gaps being wide enough to permit kernels of wheat to pass therebetween. To insure the wheat passing through these gaps they must be made of such width that it is also possible for the wild peas to pass through the same unless the latter be blown past the gaps. The head of the gang of sieves is at the right and the delivery end at the left, in respect to Figs. 1 and 2, and the sieves will be set, when in operation, to incline from their head ends downward. This inclination, in itself, will tend to cause the grain to travel from the heads to the delivery ends of the sieves. The vibratory motion which will be imparted longitudinally of the gang or in the direction of the travel of the stock, will also accelerate and insure this travel of the stock over the sieves. As the wild pea seeds are round, they will travel or roll more readily than the wheat kernels and as they travel faster, will, by the upturned lips 6, be caused to jump, and hence, more readily jump over the said gaps than will the wheat kernels. The wheat kernels will, therefore, pass downward through the gaps 8 more readily than the peas so that the tendency is to work off the wild pea seeds at the lower ends of the sieves and to cause all of the kernels of the wheat to pass downward through the gaps of the several sieves.

By the downturned lips 7, wheat kernels and pea seeds, passing through the gaps, will be temporarily intercepted in their forward movement. The passage of the wheat and some of the pea seeds through the gaps 8 will take place under a movement of the sieve from the right toward the left. To insure the downward travel of the peas that pass through the gaps, the bars 5 are provided on their undersides with forwardly inclined propelling blades 9 that extend the full length thereof, and stand in such position, that, under forward movement of the sieve, towit, from the right toward the left, they will strike the pea seeds and probably also the wheat and give the same a forward and downward impulse. This forward and downward impulse, however, is more effective on the peas than on the wheat, and hence, the effect is to hasten the travel of the peas toward the delivery ends of the sieve without, to anywhere near the same extent, hastening the travel of the wheat. In this way and by the construction described, a complete and sure separation of wild peas from wheat and similar grains is insured. These facts are based on actual use of the sieve in practice.

What I claim is:

A sieve of the kind described made up solely of approximately flat bars spaced to form gaps, said bars having upturned lips at their delivery edges and downturned lips at their receiving edges, the said bars at their undersurfaces having downwardly and forwardly inclined propelling blades adjacent to but at the rear of said gaps, as and for the purposes set forth.

In testimony whereof I affix my signature in presence of two witnesses.

NELS G. EK.

Witnesses:
BERNICE G. BAUMANN,
HARRY D. KILGORE.